United States Patent [19]

Kissam

[11] Patent Number: 4,504,498
[45] Date of Patent: Mar. 12, 1985

[54] ACOUSTIC THAWING OF FROZEN FOOD
[75] Inventor: Allan D. Kissam, Sandy, Utah
[73] Assignee: The United States of America as represented by the Secretary of Commerce, Washington, D.C.
[21] Appl. No.: 600,859
[22] Filed: Apr. 16, 1984

Related U.S. Application Data

[63] Continuation-in-part of Ser. No. 370,772, Apr. 22, 1982, Pat. No. 4,464,401.
[51] Int. Cl.³ ............................................. A23L 3/30
[52] U.S. Cl. .................................... 426/238; 99/451; 426/524; 426/643
[58] Field of Search ................... 426/238, 524, 643; 99/451, DIG. 12

[56] References Cited

U.S. PATENT DOCUMENTS 3,846,565 11/1974 Rosenberg et al. ................ 426/238

FOREIGN PATENT DOCUMENTS 53-83153 7/1978 Japan .................................. 426/238

OTHER PUBLICATIONS

Brody et al, "Ultrasonic Defrosting of Frozen Foods", Food Technology, Feb. 1959, pp. 109-112.
Nelson et al, Fishery Market News Report No. SD-3 issued Jan. 7, 1981, by the National Marine Fisheries Service, NOAA, U.S. Dept. of Commerce.

Primary Examiner—George Yeung
Attorney, Agent, or Firm—Eugene J. Pawlikowski; Alvin J. Englert; John H. Mion

[57] ABSTRACT

The thawing time of frozen block food is shortened by subjecting the frozen food to low power sound energy having a frequency in the relaxation frequency spectrum of the ice crystals in the frozen food and having a sound pressure level in the range of about 150-300 dB.

4 Claims, 4 Drawing Figures

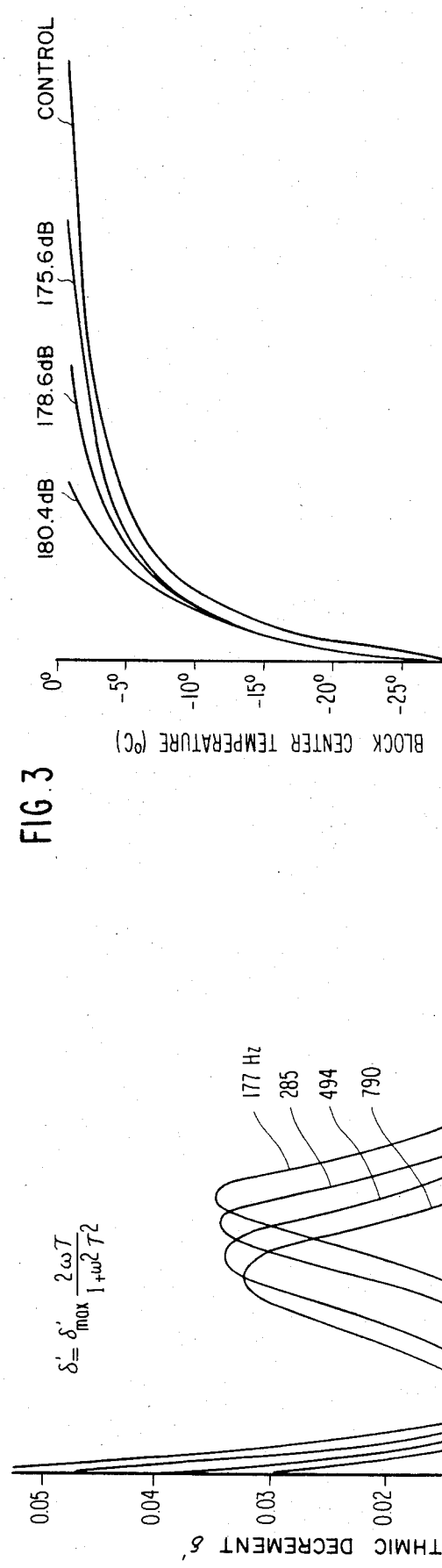
FIG. 1
FIG. 2
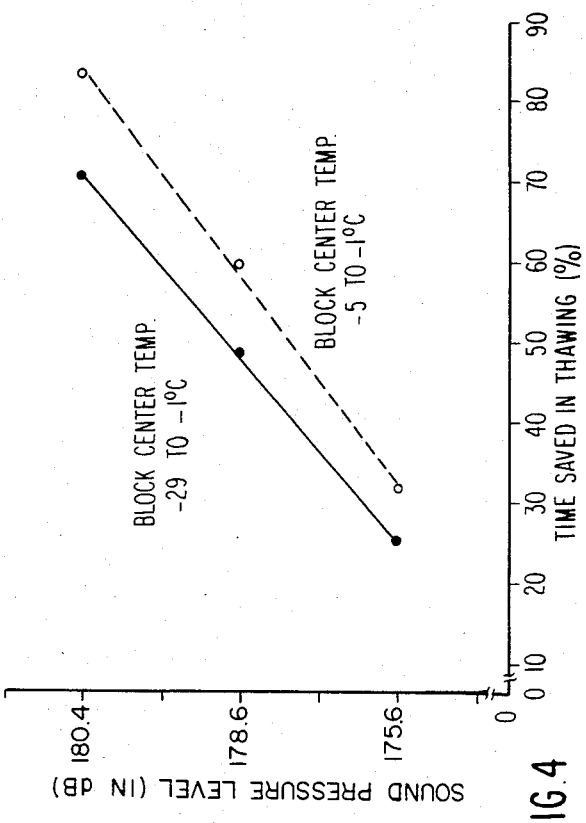
FIG. 3
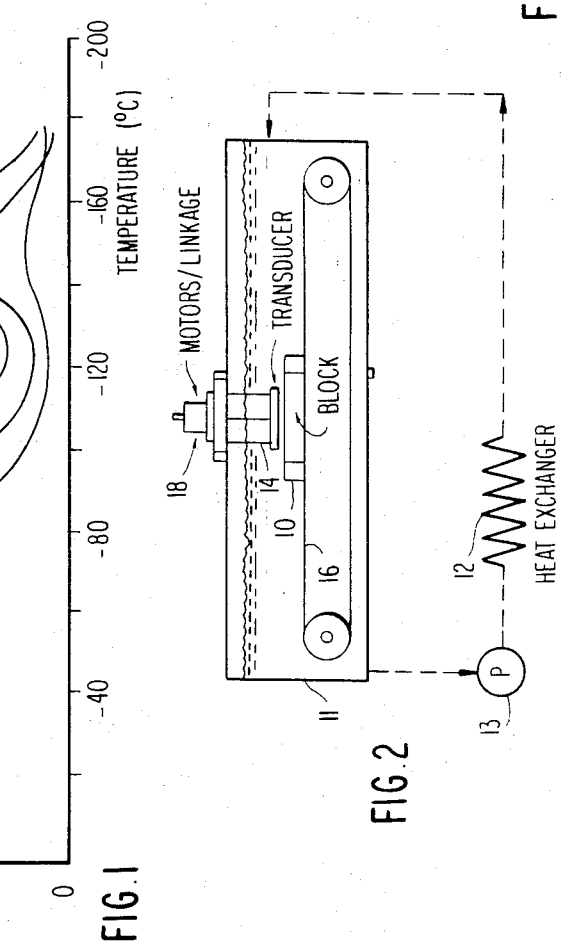
FIG. 4

ACOUSTIC THAWING OF FROZEN FOOD

CROSS-REFERENCE TO RELATED APPLICATION

This application is a continuation-in-part of application Ser. No. 370,772, filed Apr. 22, 1982, now U.S. Pat. 4,464,401 granted Aug. 7, 1984.

BACKGROUND OF THE INVENTION

1. Field of the Invention

This invention relates generally to the thawing of frozen food by the use of acoustic energy and, more particularly, to the rapid thawing of frozen food by irradiating the food with sound energy having a frequency in the relaxation frequency spectrum of the ice crystals in the frozen food and having a sound pressure level in the range of about 150-300 dB.

2. Description of the Prior Art

Brody et al, Food Technology, February 1959, pages 109-112, report the results of using ultrasonic (20 kc, 400 kc and 1000 kc) and high sonic (10 kc) energy to speed up the thawing of frozen food; however, the advantage of using acoustic energy at a relaxation frequency of the frozen food was not recognized, and lower acoustic frequencies (below 10 kc) were not tested. Furthermore, focused energy sources with power inputs of 100 or 1000 watts were used, causing excessive local heating. Brody et al concluded that the use of ultrasonic energy to defrost frozen foods did not appear to be feasible.

Rosenberg et al, U.S. Pat. No. 3,846,565, disclose a method of using ultrasonic energy to speed up the heating to a serving temperature of 180° F. of pre-cooked frozen food wrapped in a plastic packet and immersed in boiling water. An ultrasonic transducer is coupled to the water bath to provide vibratory wave energy which causes agitation of the thawed intermediate liquid layer of the food. Rosenberg et al did not recognize the advantage of using acoustic energy at a relaxation frequency of the frozen food and were interested only in raising the temperature of the frozen food to a serving temperature of approximately 180° F. in a relatively short time without concern for excessive local heating; furthermore, a high-power (250 watts at 50 kc) was required.

In Fishery Market News Report No. SD-3 issued Jan. 7, 1981, by the National Marine Fisheries Service, National Oceanic and Atmospheric Administration, U.S. Department of Commerce, Seattle, Wash. 98109, there was stated that the application of sonic energy at 1500 Hz to blocks of frozen fish fillets substantially increases the rate of thawing of the fillets. However, the report does not disclose that the sonic energy should be applied at a relaxation frequency and at low power to avoid degrading the quality of the thawed fish by producing cavitation or localized regions of excessive heating or cooking.

SUMMARY OF THE INVENTION

Thus, the general object of this invention is to reduce the thawing time while maintaining the quality of bulk-frozen foods, prior to plant-level food processing operations, by using low-power low-frequency acoustic energy at a relaxation frequency of the ice in the frozen food.

A more specific object of this invention is to reduce the thawing time of block-frozen fish by subjecting the frozen fish flesh to low-power low-frequency acoustic energy at a relaxation frequency of the polycrystalline ice in the frozen fish flesh, thereby rapidly and selectively thawing the ice without heating the thawed fish flesh to quality-degrading temperatures.

In summary, the invention relates to an improvement in rapidly thawing bulk frozen foods by the use of lower power, low frequency acoustic energy which selectively improves the heating rate of the frozen foods through ice crystal thermoelastic relaxation.

BRIEF DESCRIPTION OF THE DRAWING

FIG. 1 is a graph showing the internal damping of sodium chloride-doped polycrystalline ice samples for different frequencies (from Kuriowa, D. 1964. Internal friction of ice. Contr. Inst. Low Temp. Sci., Hokkaido Univ., A18: 1. In "The Chemical Physics of Ice." University Press, Cambridge.

FIG. 2 is a schematic diagram of an apparatus used to carry out the improved thawing method of this invention.

FIG. 3 is a graph showing the improved thawing rates obtained for cod for different sound pressure levels.

FIG. 4 is a related graph showing the relationship of sound pressure level to the reduction in thawing time.

DESCRIPTION OF PREFERRED EMBODIMENTS OF THE INVENTION

The development of rapid freezing and thawing technology has progressed at remarkably different rates of innovation. Work on fish freezing systems has been underway since 1842, while methods of improving thawing-rate received little attention until the 1950's (Burgess et al., Institute of Refrigeration, Mar. 6, 1975, Session 1974–1975). For the seafood industry, the development of large vessels having on-board bulk freezing and storage capability has prompted increasing interest in bulk thawing methods.

To process large quantities of frozen fish the shore-based industry must have the capability to thaw at rates matching the plant throughput. While quality is a major concern, the method used for thawing must also be conservative in size and operating cost. Waterman (Fishing News International, January 1963), Jason (Proc. Inst. Food Sci. Tech. (U.K.) 7(3): 146 1974), and Burgess et al (1975) discuss the problems encountered and review the present methods of thawing bulk frozen fish.

High frequency (HF) or ultrasonic wave energy may be utilized to generate the required heat inside of the material through energy absorption. The negative aspects of poor penetration, localized heating, and high power requirements result in rejection of such HF or ultrasonic absorption methods for thawing of bulk frozen fish (Brody et al, 1959; Waterman, 1963).

Early studies of ultrasonic absorption mechanisms showed inconsistencies in the classical mechanism. Absorption rates several times greater than predicted were observed at frequencies specific to a given material. Such absorption peaks were termed relaxation mechanisms and were associated with the physical properties of the material. Work on relaxation mechanisms showed that the physical properties of materials can be studied using ultrasonic measurements. The results of such measurements of the physical properties of polycrystalline ice are the bases for this invention wherein the principle of selective acoustic absorption is applied to thawing of fish.

Ice responds to frequencies in the low kilohertz range through a relaxational process. The period of relaxation is determined by the time lag between applied stress and resulting strain; hence, the frequency of relaxation is determined by the crystal mechanical properties. In a polycrystalline sample, the crystals will be oriented randomly and exhibit differing rates of response to the stress/strain excitations of wave energy. The response will also be affected by impurities in the crystal resulting from organic materials in the food which may be of a liquid nature. Only a few electronvolts of energy need be applied to activate the relaxation mechanism in an ice crystal.

The relaxation response frequency for polycrystalline ice varies with the temperature as shown in FIG. 1. Thus, the relaxation frequency at food storage temperatures (above $-30°$ C.) would be greater than 790 Hz. Fletcher ("The Chemical Physics of Ice", University Press, Cabridge, 1970) describes this relaxation response as the development of a quasi-viscous flow leading to melting at sub-normal temperatures.

The response to the wave energy, through molecular reorientation and stress/strain in the crystal, results in an upset in thermal equilibrium. Thermal currents between crystals develop, thereby increasing the energy absorption. This phenomenon is termed thermoelastic relaxation. The relaxation frequency has been approximated for polycrystalline material by Zener (Pro. Phys. Soc. (London) 52: 152, 1940) using:

$$f_o = (3\pi D/2d^2) \quad (1)$$

where $f_o$ = thermoelastic relaxation frequency in Hz; $D$ = thermal diffusity constant in m$^2$/sec; and $d$ = crystal grain size in meters.

The approximate size of the extracellular ice crystals in post-rigor and slow-frozen cod and pollock ranges from 30$\mu$ to 60$\mu$ ($\mu$ = micron). This was determined by inspection of photographs provided by Love and Haraldsson (J. Sci. Food Agr. 12: 442, 1961) and Tanaka (1. Bull Tokai Reg. Fish. Res. Lab. 60: 143, 1969).

The range or spectrum of relaxation frequencies for the polycrystalline ice structure in frozen fish flesh is estimated using equation (1). The calculation is done for a cod muscle using a thermal diffusity at $-10°$ C. of 0.43 $(10^{-6})$ m$^2$/s (Jason, 1974). This calculation results in the range, $f_{30\mu} = 2251$ Hz $f_{60\mu} = 563$ Hz Therefore, excitation of the ice crystals at 1500 Hz would result in a variety of response levels. Frozen mammalian flesh, vegetables, and fruits would all have characteristic ice crystal size and possibly highly different frequency ranges. The range may extend from about 500–10,000 Hz.

In thawing, the change in density requires a liquid mass transfer toward the solid region of the material. The liquid flow carries heat, and the transfer rate will therefore affect the thawing rate. Tien and Koump (ASME Trans. Ser. C. 92: 11, 1970) provided a complex model of the effect of density change on the solidification rate of alloys. Bakal and Hayakawa (Adv. Food research 20:217, 1973) modified Tien's equations for application to freezing foods as in equation (2).

$$v = \frac{\rho_2 - \rho_1}{\rho_2} \left[ \frac{d\epsilon}{dt} - \frac{\chi \epsilon}{2\Delta\epsilon} \frac{d\{\Delta\epsilon\}}{dt} \right] \quad 2)$$

where $v$ is the liquid flow velocity; $\rho$ is density of the frozen (1) and unfrozen (2) regions; $\epsilon$ is the location of the frozen front from the surface; $\Delta\epsilon$ is the size of the phase change region; and $\chi$ is the variable distance from the surface.

In equation (2), the parameters affecting the liquid velocity are applicable to the reverse case of thawing. If derived from a thawing application, the mathematics deriving $\epsilon$ and $\Delta\epsilon$ would change. The basic relationships to liquid velocity driven by changing density would remain relevant.

The ice crystals at the frozen front ($\epsilon$) rapidly approach phase transition when continuously exposed to relaxation frequency wave energy. Due to the large latent heat requirement, the phase change region ($\Delta\epsilon$) broadens. In comparison to a thawing process using only passive conduction heating, an acoustic-assisted process would have greater magnitudes for $d\epsilon/dt$ and $d(\Delta\epsilon)/dt$.

Acoustic extension of the phase change region requires that a greater mass of material simultaneously experience latent heating. Logically, such a situation increases the system demand for increased density and heat-energy laden moisture flow. If the magnitude of demand as a result of acoustic stimulation exceeds the hydrodynamic capacity of the material, the porosity would become a limiting factor in the thawing rate.

A one-dimensional Fourier heat conduction equation written for a multi-state system includes both heat flow by conduction and heat flow due to the flow of the liquid (Tien and Koump, 1970). Conventionally, thawing rate increases with larger thermal gradients acting on the thermal conductivity of the material. Thermal gradient methods are limited by food quality considerations, and, they also ignore the heating contribution available by increasing the liquid transfer rate. The previously described process of ice crystal relaxation is method available to influence the parameters controlling the liquid transfer rate.

Tests were conducted using blocks of headed-and-gutted Pacific cod and the apparatus of FIG. 2. The blocks were formed in a plate freezer and weighed 12.7±0.7 kg with a thickness of 91±9 mm. Following freezing, a type T (copperconstantan) thermocouple was placed at the block center by drilling a small hole in the side of the block 10.

The thawing tank 11 was 471 liters and was continuously mixed by discharge from the tank heat exchanger 12 to maintain a constant temperature. This constant temperature was necessary only to normalize all experimental measurements. Temperature of the bath was 18° C., selected because the experiments included tests to determine flesh quality following acoustic and non-acoustic thawing of identical flesh samples. The temperature of 20° C. has been determined by food scientists to be the maximum temperature for fish flesh before cooking commences. If maintenance of food quality is not a concern (for instance; thawed food is immediately cooked or mechanically modified), then the maximum temperature could be raised as desired. Thus the bath temperature may be in the range of about 1°–100° C. for water or up to 250° C. for, say, oil. For most applications, the bath will be water and the temperature in the range of 5°–25° C.

A pump 13 maintained water velocity over the submerged block at 3.8 cm/s; again the numbers were selected for purposes of experimental design. Research to be discussed in following sections shows that intense water flow velocity has no effect on the food thawing rate. The high water velocity was, therefore, necessary to eliminate the possible claims that acoustics merely change the surface water velocity.

The ceramic transducer 14 (Edo Western Corp. Model no. 6649) had a ceramic disc area of 239 cm$^2$. Calibration data were provided to allow calculation of the sound pressure level produced by the voltage applied to the transducer. As used in this specification and the claims, the reference sound pressure level (0 dB level) is 1 $\mu$Pa (micropascal) in water at 1 meter from the transducer. The transducer was driven by a conventional signal generator, audio amplifier and matching transformer. Input voltage was measured at the transducer leads.

A calibrated hydrophone was used to measure the sound pressure level at a constant distance along the accoustic axis of the transducer. This sound pressure level measurement assured that all acoustic energy, regardless of the frequency, exerted identical pressure on the food.

The thawing tests were conducted with the block 10 secured to a wire belt 16 with two lengths of surgical tubing and with the transducer 14 positioned for light contact with the block 10. An assembly 18 of motors and linkage moved the belt and transducer to distribute the 239 cm$^2$ transducer over the 1500 cm$^2$ block surface. The thawing time was measured at the center for the range of $-29°$ C. to $-1°$ C. Voltage was applied to the transducer to achieve sound pressure levels of 175.6 dB, 178.6 dB, and 180.4 dB at 1 meter. Reduction in thawing time was referenced to control blocks thawed using only heated water. During the thawing test, a second thermocouple was inserted under the skin of a fish on the transducer-contacted side. This second thermocouple measured any temperature difference in the surface flesh exposed to acoustics versus the control.

Immediately after thawing, fish from the transducer side of the 178.6 dB and 180.4 dB thawing tests were compared to the control for quality. Tests included salt-soluble protein extraction (Dyer et al., J. Fish. Res. Board Canada, 7(10): 585, 1950), moisture, and fat (AOAC, 1980, "Official Methods of Analysis,", 13th ed. Assoc. Official Analytical Chem., Washington, DC), and water-holding capacity (Miyauchi, Food Technol. 16(1): 70, 1962). Sensory evaluation included triangle tests and quality attributes, such as flavor, texture and rancidity.

The sensory test panelists were experienced in fish quality evaluations.

FIGS. 3 and 4 illustrate the thawing rate improvements obtained using the 1500 Hz acoustic energy for cod and pollock. These results represent the average of duplicate tests at each of the indicated ceramic transducer input power settings. The thawing times were consistent ($\pm 2$ minutes) with the average time.

One data point was taken at 180.4 dB and 5,500 Hz for the temperature span of $-5°$ C. to $-1.7°$ C. For this experiment, only a 10% time savings over control was observed.

From the foregoing, it is concluded that the frozed food should be irradiated with sound having at least one frequency which lies in the relaxation frequency spectrum of the ice crystals in the frozen food. The sound frequency preferably is in the range of about 500–10,000 Hz, as the acoustic stimulation of thawing is greatly reduced outside this range.

The sound pressure level should be in the range of about 150–300 dB. Below 150 dB the acoustic stimulation is negligible and above 300 dB the equipment cost rises steeply. The preferred sound pressure level is about 175–230 dB.

The thermocouple placed under the skin of a fish contacted by the transducer did not measure any abnormal temperature in comparison to the controls. In no instance did the surface flesh reach the bath temperature of 18° C. The surface flesh temperature data indicates that the wave energy is not dispersed in the thawed flesh regions. Surface dispersion is a major drawback of HF absorption heating methods.

The impedance of the phase change region is distinctly different due to the non-uniform density and random location of ice crystals. Scattering and energy dispersion would result from the interface between the frozen and thawed flesh regions. Zener (1940) showed that the internal friction resulting from thermal flow is not a function of the vibrational amplitude. Hence, the increases in transducer power required to maintain the relaxational process at the frozen front are a function of the size of the phase change region.

Using the transducer calibration, the output at the transducer face was 0.07 w/cm$^2$ for the 180.4 dB tests. The radiation pattern is spherical, so wave incidence is not optimum for energy transfer across the entire transducer area. If complete absorption is assumed, 21 watt-hours were delivered by the transducer to one surface of the fish block. Whole cod at $-29°$ C. requires 310 kJ/kg for thawing (Christie and Jason, Torry Memoir No. 596, Torry Research Station, Aberdeen, Scotland, 1975). An energy input requirement of 559 watt-hours for the half-block may be computed. Under optimum absorption conditions, the transducer has delivered 4% of the required thawing energy.

In a complete study of water-thawing cod blocks, circulation velocities over the block surface from 0.4 to 4.0 cm/s resulted in identical thawing rates (MacCallum and Ellis, J. Fish. Res. Board Canada 21(1): 115, 1964). The cyclic wave pressure of the acoustics in this experiment would not significantly improve surfce heat transfer given the 3.8 cm/s flow over the block. The wave pressure is not contained by a rigid cell and would not force water between the carcasses. The carcasses were densely packed and were not separated during thawing.

Conduction heating processes will not deliver the energy required in the observed time unless the effects of relaxation and liquid transfer are considered. The control blocks thawed in this experiment required 255 minutes ($-29°$ C. to $-1°$ C.) using an 18° C. water bath. Christie and Jason (1975) thawed 100 mm thick cod blocks in 290 minutes ($-30°$ C. to $-1°$ C.) using an 18° C. vacuum condensation process.

The results of the quality analyses are presented in Tables I–III. Fish obtained for this study were obtained from different locations over a 3month period. Run 1 fish were larger with an average weight of 1600 g as compared to runs 2 and 3 with an average weight of 980 g. The fish were received headed and gutted, so it was difficult to tell if the fish had recently spawned.

TABLE I

Triangle tasted panel results of acoustic versus water thawed cod.

| Sound Pressure Level in dB | Comparisons (no.) | Correct responses (no.) | Significance (5% level) |
|---|---|---|---|
| 178.6 (run 1) | 8 | 3 | Not Significant |
| 180.4 (run 2) | 10 | 5 | Not Significant |
| 180.4 (run 3) | 10 | 6 | Not Significant |

TABLE II

Taste panel evaluation of acoustic and water thawed cod versus fresh cod.

| Thawing method | n | Flavor | Texture | Rancidity | Acceptability |
|---|---|---|---|---|---|
| Run 1 | | | | | |
| Acoustic (178.6 dB) | 8 | 4.0 ± 0.8 | 4.0 ± 1.1 | 4.8 ± 0.5 | 3.6 ± 1.1 |
| Water | 8 | 4.1 ± 0.9 | 4.0 ± 0.9 | 4.9 ± 0.4 | 3.9 ± 0.6 |
| Fresh (non-frozen) | 8 | 3.8 ± 1.2 | 4.3 ± 0.5 | 4.8 ± 0.5 | 3.8 ± 0.9 |
| Run 3 | | | | | |
| Acoustic (180.4 dB) | 10 | 3.4 ± 0.8 | 4.0 ± 0.8 | 4.5 ± 0.8 | 3.4 ± 0.7 |
| Water | 10 | 3.5 ± 0.9 | 4.0 ± 1.1 | 4.8 ± 0.5 | 3.4 ± 0.9 |
| Fresh (non-frozen) | 10 | 3.6 ± 0.5 | 3.9 ± 0.8 | 4.8 ± 0.5 | 3.6 ± 0.5 |

Rating Scales:

| Flavor | Texture | Rancidity | Acceptability |
|---|---|---|---|
| 5 = very good | 5 = normal | 5 = none | 5 = like very much |
| 4 = good | 4 = slightly (soft, tough) | 4 = | 4 = like slightly |
| 3 = fair | 3 = soft, tough | 3 = slight | 3 = neither like/dislike |
| 2 = borderline | 2 = very (soft, tough) | 2 = | 2 = dislike slightly |
| 1 = poor | 1 = mush, rubbery | 1 = strong | 1 = dislike very much |

TABLE III

Chemical analyses of acoustic versus water-thawed cod.

| Thawing method | n | Moisture (%) | Fat (%) | Water holding capacity (%) | Salt soluble protein (%) |
|---|---|---|---|---|---|
| Run 1 | | | | | |
| Acoustic (178.6 dB) | 3 | 82.4 ± 0.0 | 1.6 ± 0.0 | 54.0 ± 1.4 | 58.6 ± 4.2 |
| Water | 3 | 82.5 ± 0.0 | 1.6 ± 0.0 | 49.9 ± 3.3 | 44.3 ± 3.2 |
| Run 3 | | | | | |
| Acoustic (180.4 dB) | 3 | 79.9 ± 0.1 | 0.5 ± 0.0 | 70.1 ± 2.6 | 43.9 ± 1.3 |
| Water | 3 | 79.9 ± 0.3 | 0.6 ± 0.1 | 70.4 ± 3.5 | 41.7 ± 2.6 |

In the triangle test, coded samples of two water-thawed and one acoustic-thawed, the correct response was not significant at the 5% level (Roessler et al., J. Food Sci. 43: 940, 1978). The panelists were not asked to provide an evaluation of sensory attributes for the triangle test samples.

The sensory attributes comparison of water-thawed, acoustic-thawed, and fresh cod samples was subjected to analysis of variance. The objective of the variance analysis was to determine if there was any detectable difference based on a specific attribute. It was observed that there was no statistical difference at any level using the methods of Sokal and Rohlf ("Biometry" W. H. Freeman Pub., San Francisco 1969).

The chemical comparison of acoustic versus water-thawed flesh (Table III) was consistent within a thawing test run. Variation between runs may be due to the fish size and spawning condition previously discussed. Several problems were encountered in the extraction of salt-soluble proteins and contributed to the generally low recoveries. The homogenization of flesh was not uniform due to bulking and froth formation. In centrifuge bottles, the proteins formed congealed pellets which were difficult to transfer to Kjeldahl flasks.

The analyses and sensory evaluation tests indicate that the flesh thawed using acoustics compares favorably with water-thawed. In comparison to fresh (non-frozen) cod, the thawed samples for both control and acoustic compared favorably.

A higher throughput using a rapid thawing system may be attained by transferring frozen stock to a higher temperature storage in advance of complete thawing; however, this reduces only the sensible heating requirements.

The latent heating requirements are the most time consuming thawing region. The control blocks in this experiment required 184 minutes to span the −5° C. to −1° C. phase change region. The application of 1500 Hz acoustics at a sound pressure level of 180.4 dB reduced this time to 34 minutes. The primary advantage of the acoustics was the reduction of the time held at phase change temperatures, an 82% reduction for this example.

In comparison to other absorption heating methods, the low frequency and low power acoustics appear to stimulate heat transfer, rather than aggressively apply energy. The major operating cost for an acoustic thawing system would be heating of the water bath.

Consider the requirements for a theoretical thawing unit of capacity 1300 kg/hour and using 150 omni-directional transducers run in parallel at 60 watts continuous each. This allows for 100 blocks per hour. The energy input for the electronics, allowing for efficiency at the matching transformers and amplifiers, is approximately 18 kw-hour. The energy input required from the water bath is approximately 112 kw-hour. Additional energy is required for pumps and motors. Assume the total system consumes 150 kw-hour to thaw 1300 kg.

Operation of the acoustic system during a work shift to that 9100 kg would consume 1050 kw-hour: A system using only water would require 840 kw-hour. This assumes that the water process blocks were broken up mechanically or by hand to achieve the 9100 kg throughput.

The estimated 210 kw-hour additional energy must be balanced against the space devoted to one system versus several, reduced water demand, possibly reduced labor costs, and the rapidity of thawing. Several acoustic systems of 1300 kg/hour capacity could be installed in the space devoted to one conduction system with a total average capacity of 1300 kg/hour.

The system design for an acoustic/conduction thawing system incorporates the electronics into a simple circulated liquid bath. The transducers or the frozen food are moved if necessary to distribute the wave energy over the entire block surface. No insurmountable engineering task is apparent. Other conventional design tasks include a parallel impedance matching transformer, specifications for the signal generator and amplification system, and a layout to minimize labor. The sound is audible and would require acoustic enclosures for the equipment in addition to ear protection for workers.

While the invention has been described with reference to specific embodiments, numerous changes will be obvious to those skilled in the art. For example, the signal generator could be pulsed to produce an average sound pressure level in the desired range of about 150–300 dB. The signal frequency could be swept over all or a part of the desired band of about 500–10,000 Hz to produce the relaxation reponse in all of the various sizes of ice crystals in the frozen food.

Similarly, the water or oil bath could be pressurized to raise the boiling point and to prevent any undesired cavitation by the sound field. The food could be enclosed in an evacuated plastic bag before immersion in the bath, or the bath could be enclosed in a flexible plastic bag adapted to contact or envelope the frozen food. Accordingly, the invention is intended to include all embodiments and variations which are covered by the following claims.

I claim:
1. A method of thawing frozen food, comprising:
    immersing the frozen food in a liquid bath having a temperature in the range of about 1°–250° C., and
    irradiating the frozen food in the liquid bath with sound having a frequency in the relaxation frequency spectrum of the ice crystals in the frozen food and a sound pressure level in the range of about 150–300 dB.
2. The method as defined in claim 1 wherein the temperature of the liquid bath is in the range of about 5°–25° C.
3. The method as defined in claim 1 wherein the frequency of the sound is in the range of about 500–10,000 Hz.
4. The method as defined in claim 1 wherein the sound pressure level is in the range of about 175–230 dB.

* * * * *